July 1, 1941.  W. L. O'BRIEN  2,247,730
CONDENSER FINNING MACHINE
Original Filed Oct. 26, 1936   9 Sheets-Sheet 1
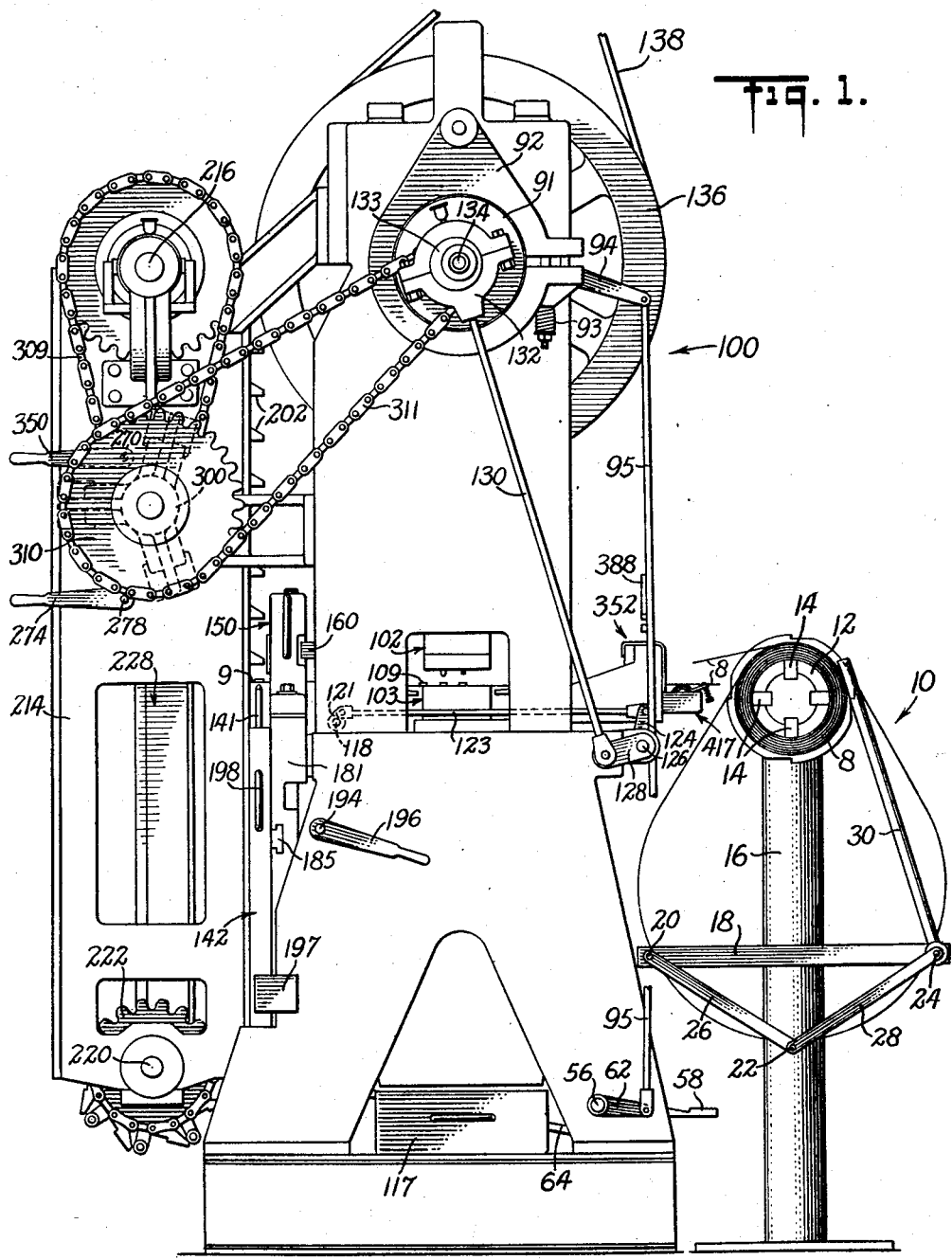
INVENTOR
William L. O'Brien
BY
Blair, Curtis, Dunne & Hayward
ATTORNEYS July 1, 1941.  W. L. O'BRIEN  2,247,730
CONDENSER FINNING MACHINE
Original Filed Oct. 26, 1936   9 Sheets-Sheet 2
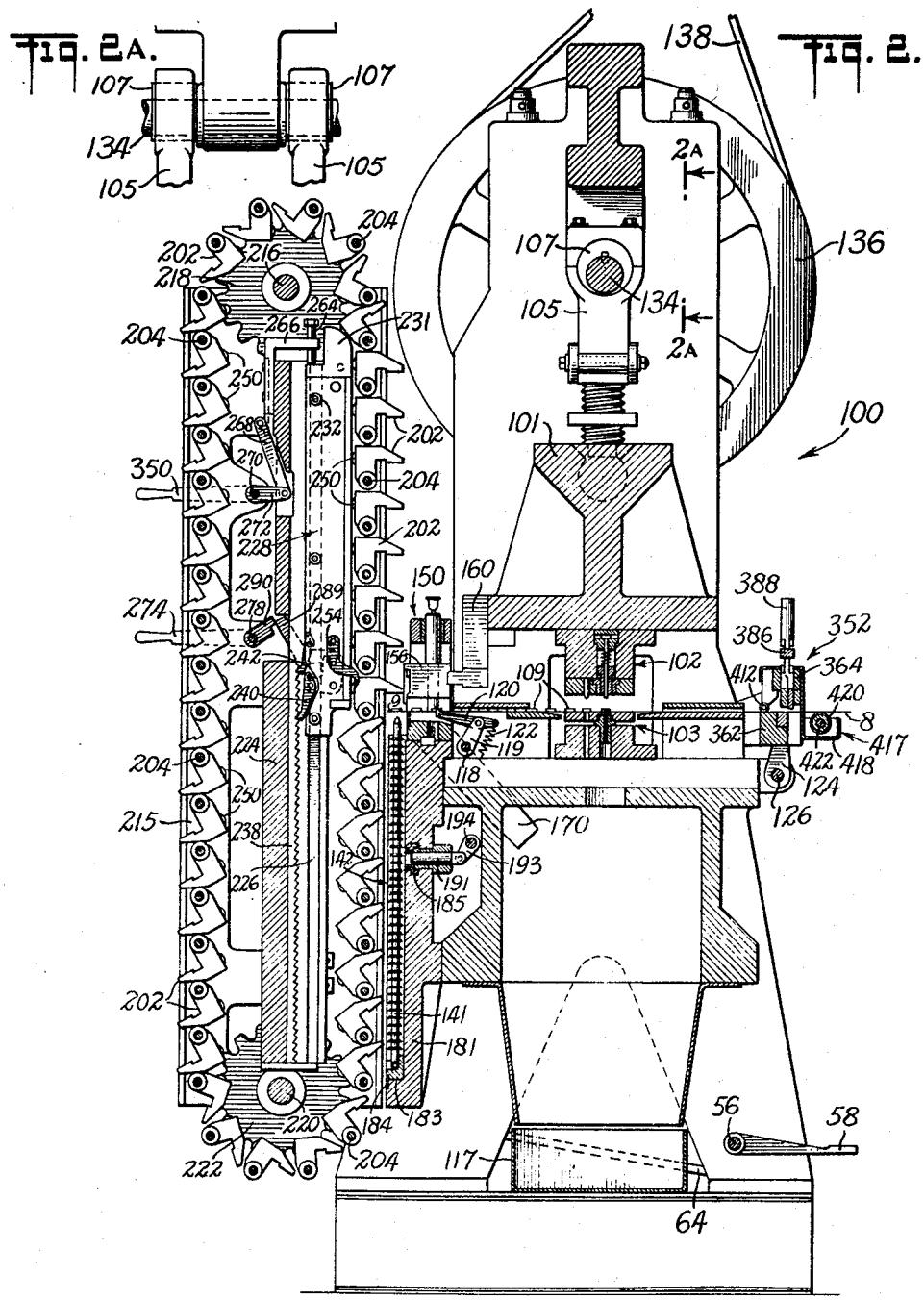
INVENTOR
William L. O'Brien
BY
Blair, Curtis, Dunne & Hayward
ATTORNEYS

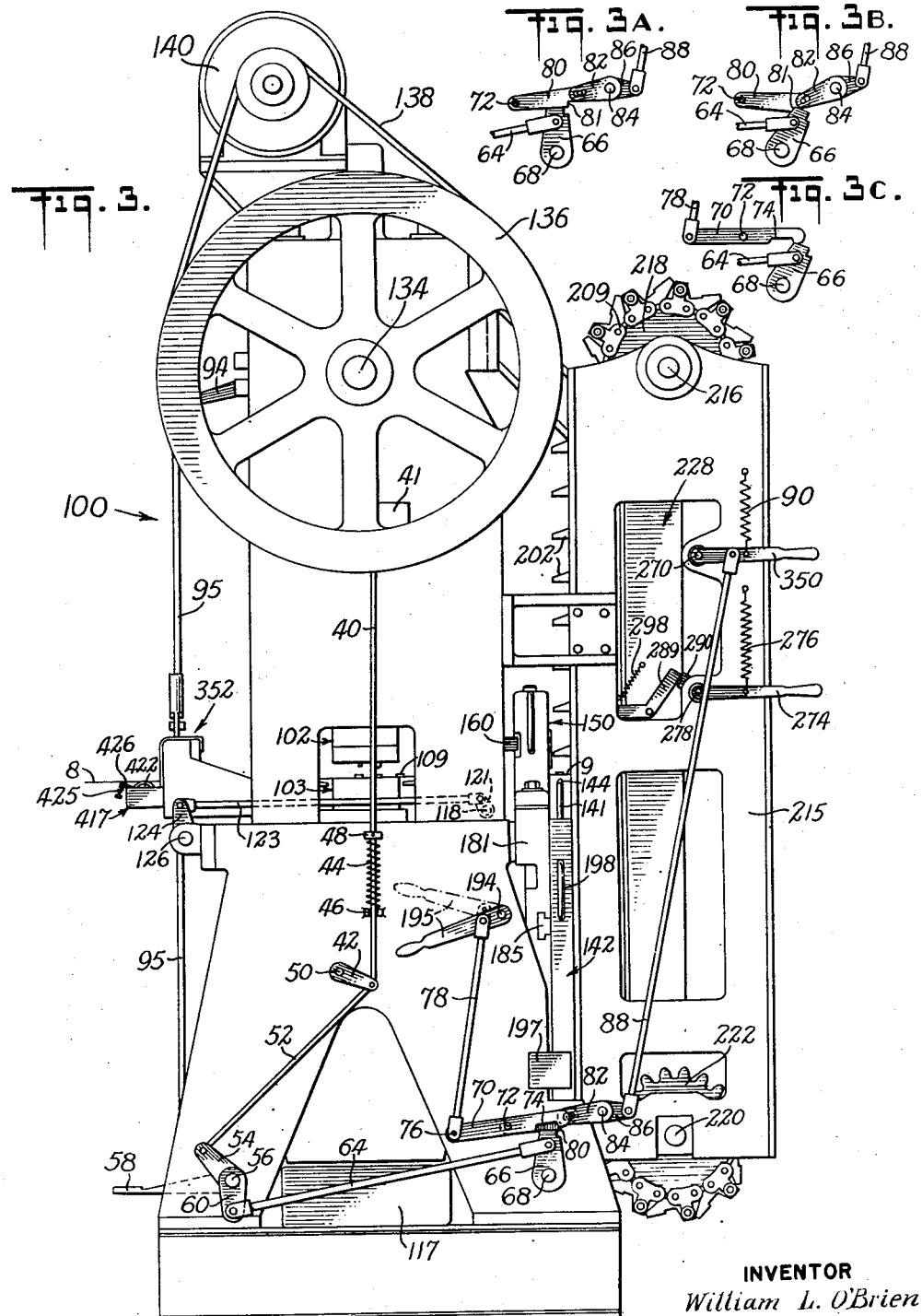

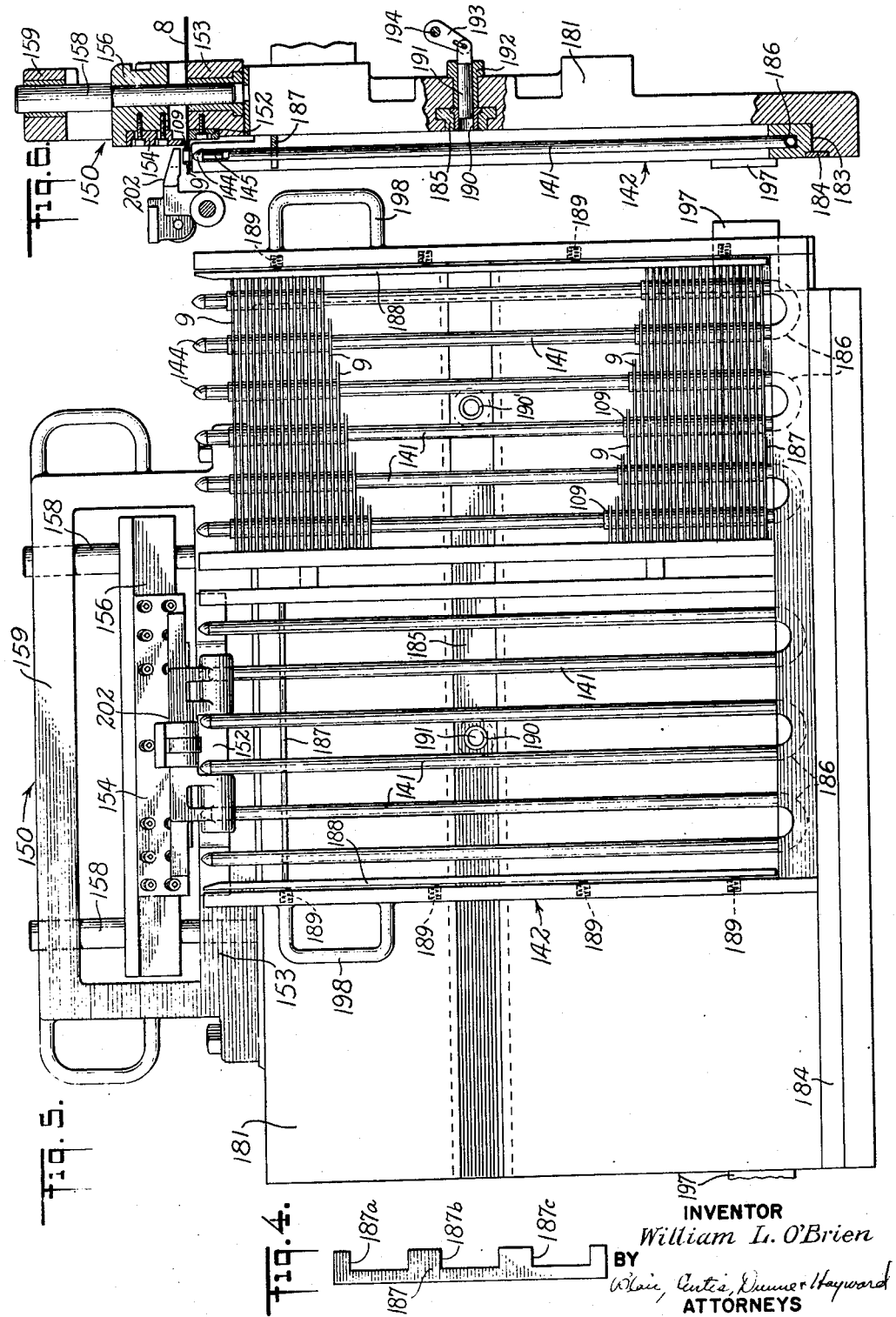

July 1, 1941.  W. L. O'BRIEN  2,247,730
CONDENSER FINNING MACHINE
Original Filed Oct. 26, 1936  9 Sheets-Sheet 5
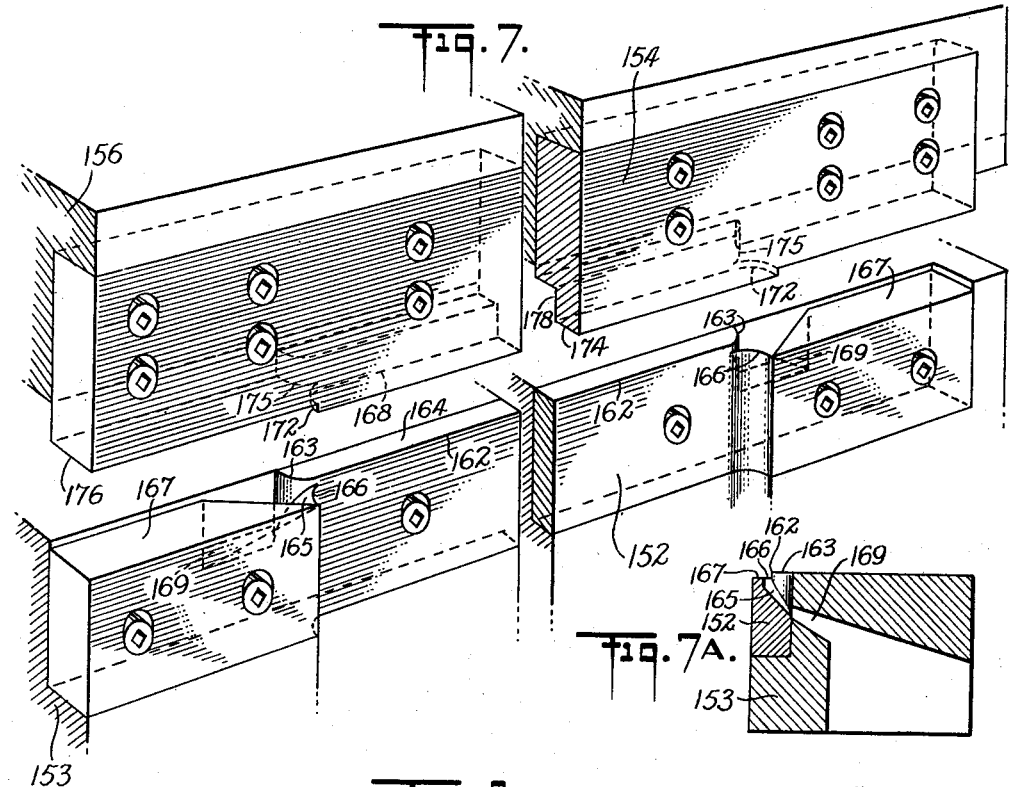
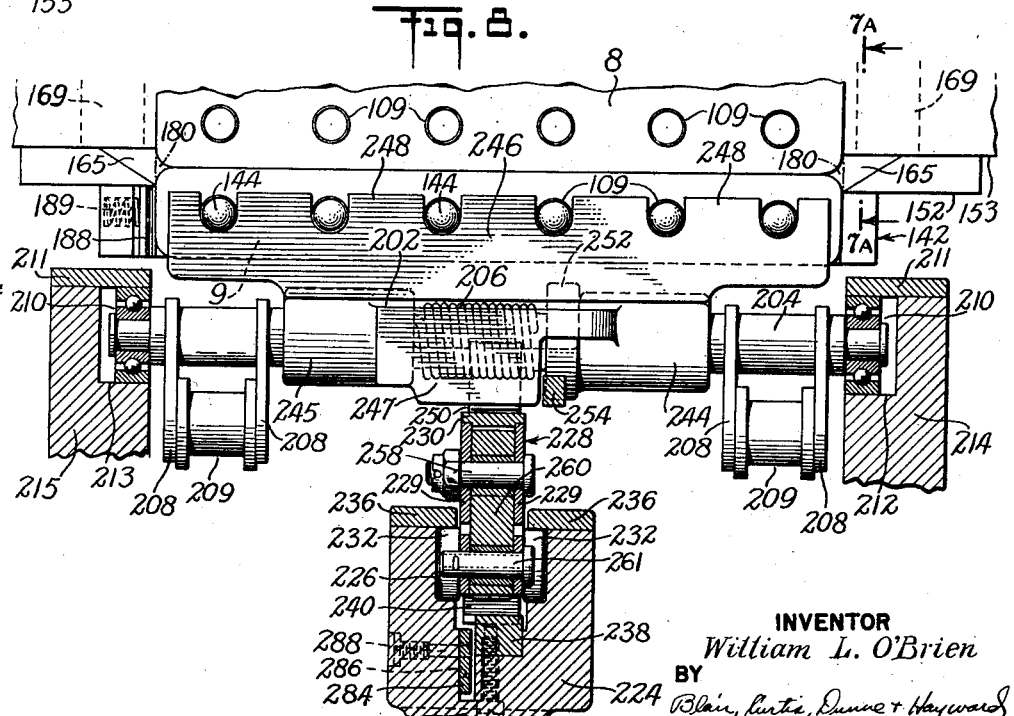
INVENTOR
*William L. O'Brien*
BY
ATTORNEYS July 1, 1941.  W. L. O'BRIEN  2,247,730
CONDENSER FINNING MACHINE
Original Filed Oct. 26, 1936   9 Sheets-Sheet 6
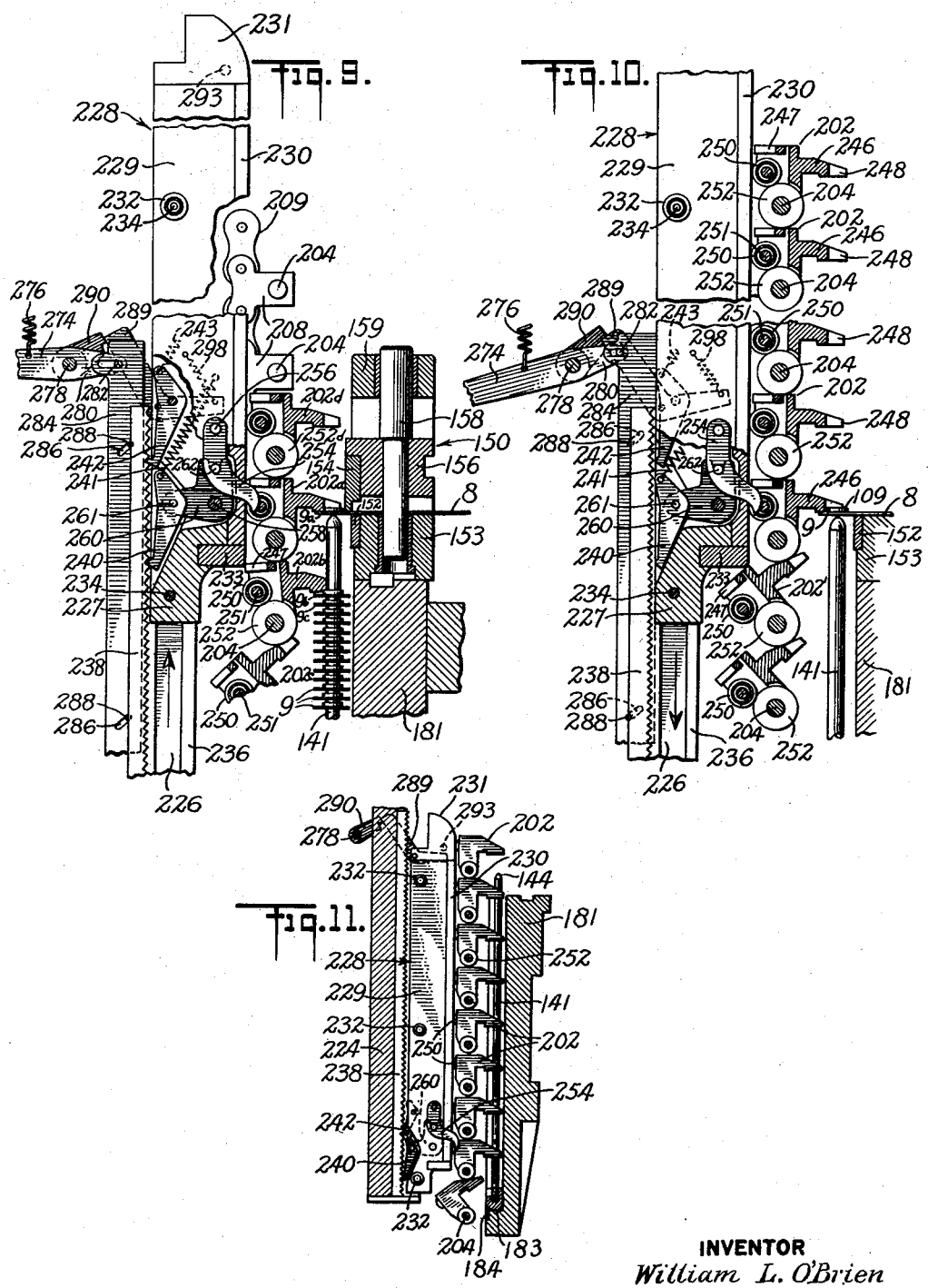
INVENTOR
William L. O'Brien
BY
Blair, Curtis, Dunne & Hayward
ATTORNEYS July 1, 1941.  W. L. O'BRIEN  2,247,730
CONDENSER FINNING MACHINE
Original Filed Oct. 26, 1936  9 Sheets-Sheet 7
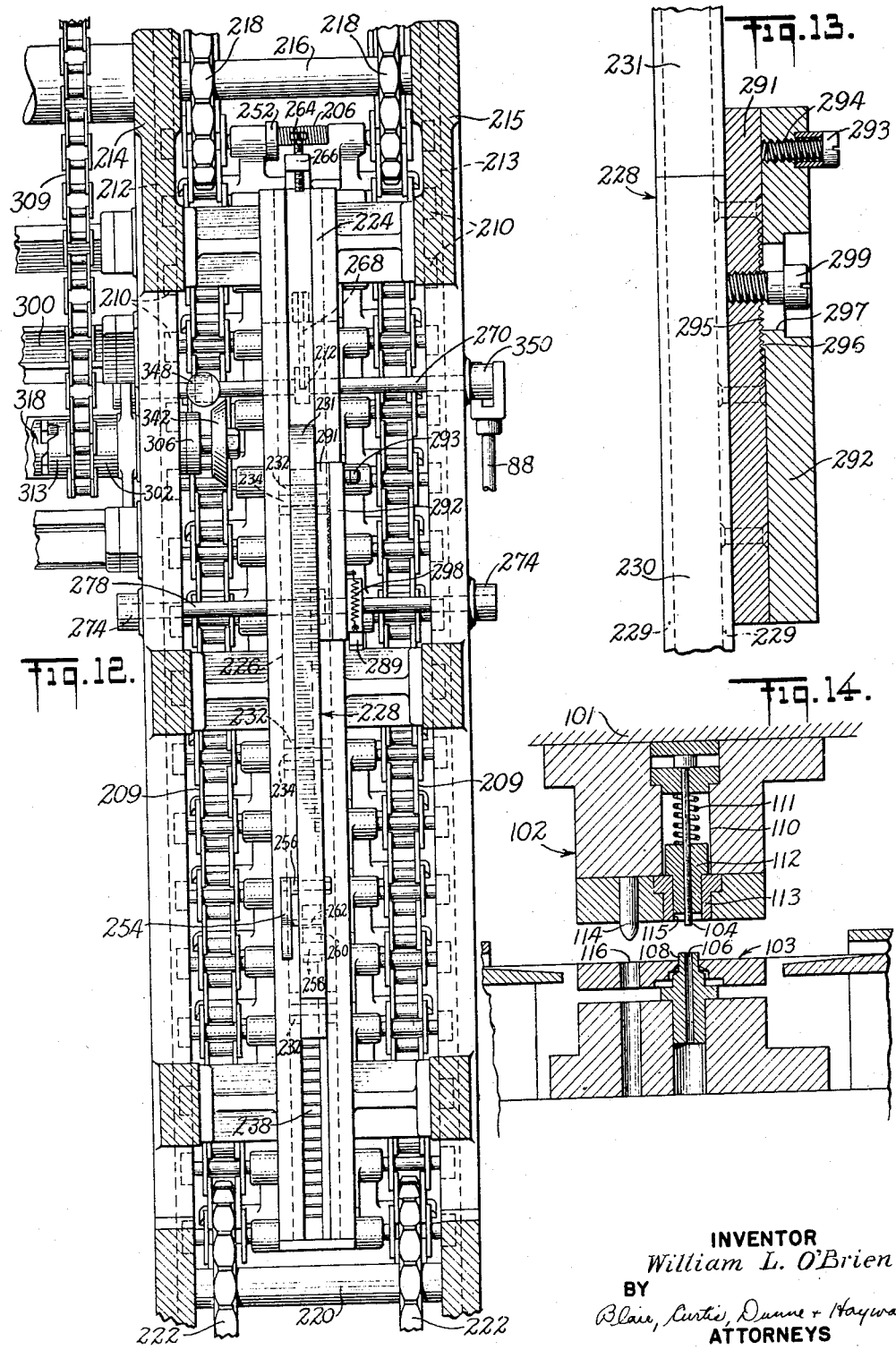
INVENTOR
William L. O'Brien
BY
Blair, Curtis, Dunne + Hayward
ATTORNEYS

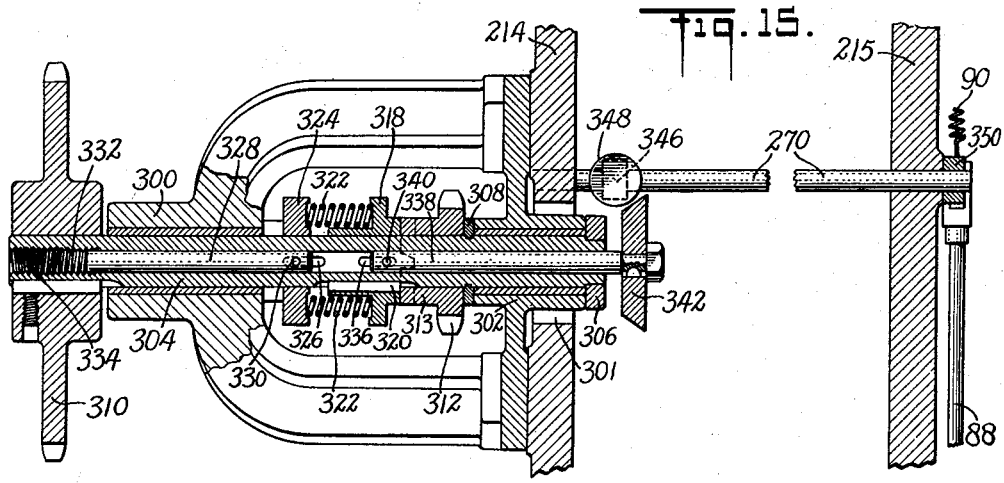
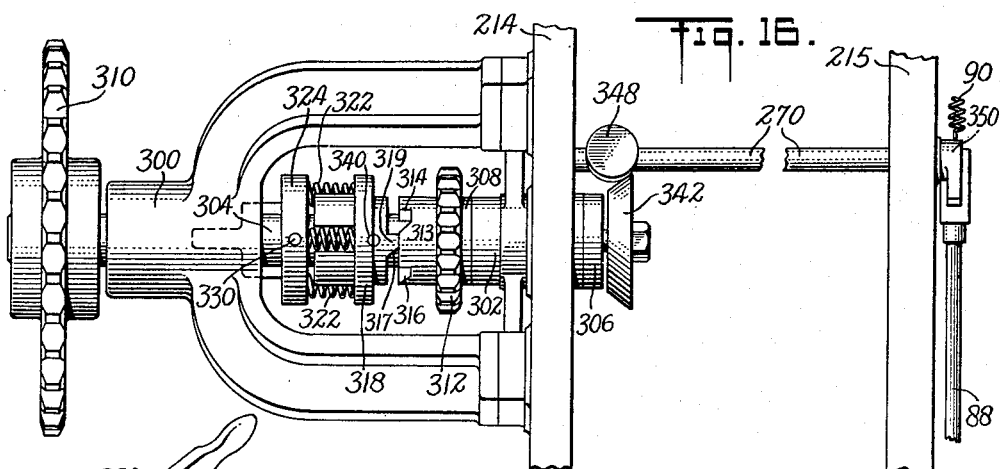
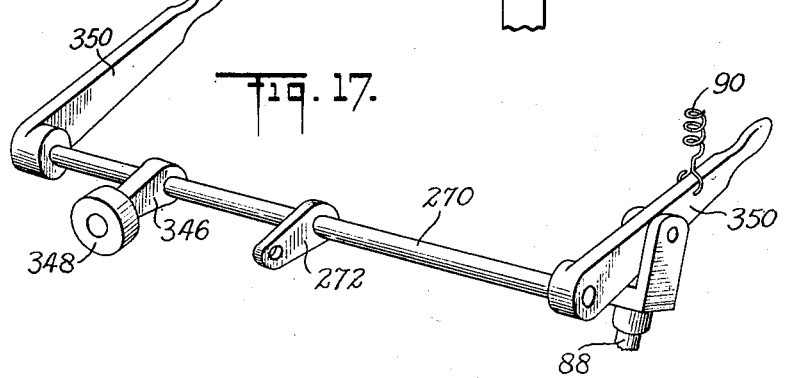

July 1, 1941.  W. L. O'BRIEN  2,247,730
CONDENSER FINNING MACHINE
Original Filed Oct. 26, 1936   9 Sheets-Sheet 9
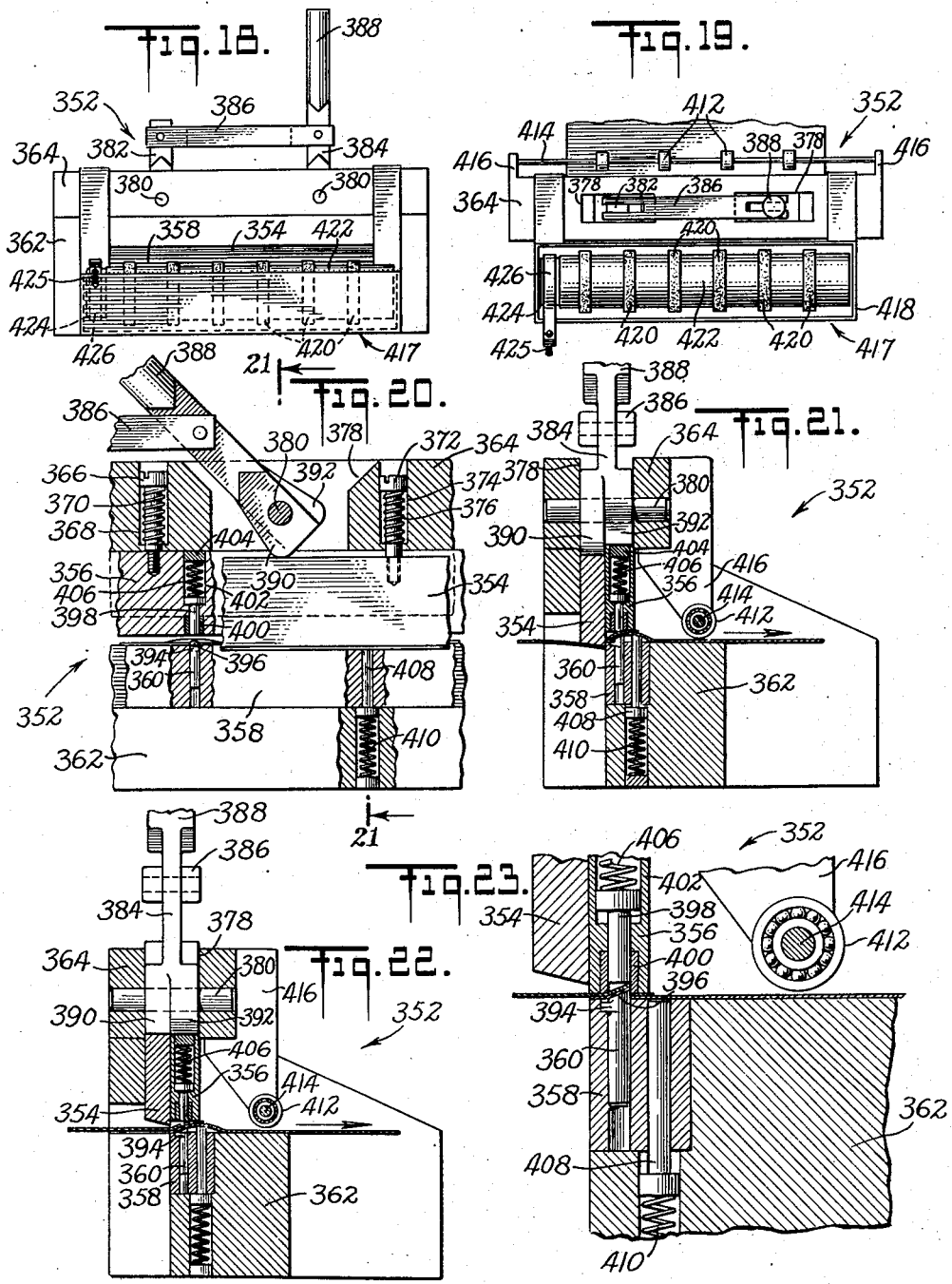
INVENTOR
William L. O'Brien
BY
Blair, Curtis, Dunne + Hayward
ATTORNEYS Patented July 1, 1941

2,247,730

UNITED STATES PATENT OFFICE 2,247,730

CONDENSER FINNING MACHINE

William L. O'Brien, Evansville, Ind., assignor to Servel, Inc., New York, N. Y., a corporation of Delaware Original application October 26, 1936, Serial No. 107,739. Divided and this application August 17, 1939, Serial No. 290,568

10 Claims. (Cl. 29—84)

This invention relates to sheet metal working machines, and more in particular to machines for making condenser fins from sheet metal and for placing the fins upon condenser pipes.

An object of this invention is to provide an automatic machine which will make sheet metal members and place them in spaced relationship upon longitudinal members, such as pipes.

In the illustrative embodiment shown:

Figure 1 is a side view of the machine with the fin-material-holding means (shown at the right) moved up to the press and with a portion of the adjacent brake control rod 95 cut away;

Figure 2 is a vertical section of the machine;

Figure 2a is a view of the main power shaft from the line 2a—2a of Figure 2;

Figure 3 is a view of the machine from the side opposite to that shown in Figure 1;

Figures 3a, 3b and 3c are detail views of latch means later to be described;

Figure 4 is a view of the means for assisting in holding a set of U-tubes in position;

Figure 5 is a view showing the U-tube-holding means and the fin cutting means;

Figure 6 is an end view of the elements shown in Figure 5 with various portions cut away so as to show the detailed structure;

Figure 7 is an enlarged view of the fin cutter;

Figure 7a is a sectional view on the line 7a—7a of Figure 8;

Figure 8 is a horizontal section of a portion of the machine in the path of the fin-material feeding therethrough and showing (at the lower part of the figure) one of the followers in position to receive a fin, together with the structure for controlling the position of the followers;

Figure 9 is an enlarged view similar to the left-hand central portion of Figure 2, showing the fin-cutting means and the follower control mechanism with portions cut away so as to show the details;

Figure 10 is a view similar to Figure 9, showing the follower control mechanism in a different position;

Figure 11 is a sectional view similar to a portion of Figure 2 but showing the parts in a different position;

Figure 12 is a vertical section of the follower moving mechanism;

Figure 13 is an enlarged sectional view of a portion of Figure 12 showing certain details;

Figure 14 is an enlargement of the right-hand central portion of Figure 2;

Figure 15 is a vertical section showing the details of the safety stop mechanism;

Figure 16 is a side elevation of the safety stop mechanism;

Figure 17 is a view of the stop shaft showing the elements which are rigidly mounted thereon;

Figure 18 is a view from the right side of Figure 1 showing the stitcher for connecting the strips of fin material to each other to insure continuous feed, and the oiler mechanism;

Figure 19 is a top view thereof;

Figure 20 is an elevation of the stitcher, showing the element (which cuts the ends of the strips of fin material preparatory to stitching) in the down position, and with portions of the various elements cut away so as to show details of the structure;

Figure 21 is a sectional view on the line 21—21 of Figure 20;

Figure 22 is a view similar to Figure 21 but showing the cutter element in its upper position; and Figure 23 is an enlarged view of certain parts shown in Figure 21, showing the cutter (at the left) in its upper position and the adjacent stitcher in its down position.

This application is a division of my copending application, Serial No. 107,739, filed October 26, 1936, and entitled "Condenser finning machine," and issued on December 10, 1940, as Patent No. 2,224,549.

In heat exchange elements, such as condensers, radiators, and evaporators, where it is desirable either to add heat or take heat away from fluid within tubes or pipes, metallic fins may be provided upon the tubes to carry heat from or to the tubes, as the case may be. In the manufacture of these heat exchange elements, the tubes may be made up of U-shaped portions upon which the fins may be placed. If desirable, a set may include two or more U-tubes placed parallel to each other and the fins may be placed upon all of them at the same time. After the fins are in place, the U-tubes may be joined together so as to form a continuous circuit.

The preferred embodiment of the present invention is a machine for making the fins for a condenser from a strip of sheet metal and for placing the fins upon U-tubes in spaced relationship.

Referring to the right-hand portion of Figure 1 of the drawings, a strip of sheet metal, which is the fin material and is designated by the numeral 8, is shown in the form of a coil held by a holder 10. The end of strip 8 is unwound and extends to the left through press 100 which has (as best shown in Figure 3) a main power shaft 134 driven by motor 140 through belt 138 running upon fly-wheel pulley 136, there being a fly-wheel clutch of any usual type (not shown) connecting fly-wheel pulley 136 with shaft 134. Referring to Figure 2, during operation of the machine, strip 8 is advanced to the left through pass 100 where rows of flanged holes are formed across strip 8 at spaced points. To the left of press 100, in the path of strip 8, is cutter 150 which, as best shown in Figure 9, cuts from strip 8 individual fins.

Referring to the upper portions of Figures 5 and 6, particularly the latter, directly below the flanged holes 109 in the strip end 9, when strip end 9 is in position to be cut from strip 8 to form a fin, are the ends of a set of three U-tubes 141 which are held in place by the large sliding rack 142. Fitted upon each end of each of the U-tubes 141 is a round-nosed plug 144 which is held in place by an extension 145 which extends into the end of the tube. Plugs 144 have a maximum diameter the same as the outside diameter of the tubes, and are adapted to enter the flanged holes in fin 9 and effectively position the ends of the U-tubes therein.

Referring to the left-hand portion of Figure 2, a plurality of angularly shaped followers 202 are carried upon two endless chains (only one of which is shown) and are the active elements of the fin-positioning means. As each fin 9 is cut from strip 8, it is pushed by a follower 202 downwardly along U-tubes 141 and properly spaced thereon.

Referring particularly to Figure 2a and the upper right-hand portion of Figure 2, the main shaft 134 has rigidly mounted thereon two eccentrics 107 upon each of which is mounted a pitman 105 which extends downwardly and upon the end of which is mounted plunger head 101. Plunger head 101 is adapted to move up and down, and in such movement is guided by means (not shown) upon the inside of each side member of the press. Upon the bottom face of plunger head 101 is fixed the block 102 of the perforating mechanism which is shown enlarged in Figure 14.

Directly below the block 102 is the anvil 103 of the perforating mechanism. Elements 102 and 103 cooperate in such a way that rows of holes are punched in the strip of fin material traveling therebetween, and then the metal around each hole is expanded into a flange. Each row of holes extends across the width of the strip and is so positioned that it is along the center line of the metal that will later be a fin. There are six holes in each row, and the remains for producing one of the holes is shown in cross-section. This is a cutting pin 104 fixed in block 102 and a cooperating hole 106 in anvil 103. Surrounding hole 106 is an upstanding sleeve 108, and surrounding pin 104 is a sliding sleeve 112 which may move up and down relative to pin 104 in the circular opening 110 formed in block 102. The lower end of sleeve 112 slides freely in collar 113 which is rigidly mounted in block 102, there being an enlargement upon the upper end of sleeve 112 which acts as a stop means. Surrounding the upper end of pin 104 and exerting pressure upon the upper end of sleeve 112, so as normally to hold sleeve 112 in its lowermost position, is spring 111. After cutting pin 104 enters hole 106 and as block 102 moves farther downwardly, sleeve 108 enters recess 115 in collar 113 and, in doing so, forms an upwardly extending, sharp-edged flange 109 (see Figure 6) around the hole, the flange entering recess 115. Recess 115 is slightly larger in diameter than sleeve 108 so as to allow room for flange 109. During the latter portion of the movement of block 102 downwardly, sleeve 112 is engaged and held stationary by the upper end of sleeve 108. As will be explained later, this flanged hole is formed to fit upon a condenser pipe.

When block 102 has reached its lowest position and starts upwardly again, sleeve 112 is pushed downwardly with respect to block 102 by spring 111, so as to free the flange 109 from recess 115.

As best shown in Figure 2, the material cut from strip 8 in forming holes falls to the bottom of the press through suitable openings to a container 117. The forming of flange 109 is facilitated by oil which is placed upon the bottom surface of strip 8 as it enters the press by the oiler 417.

Referring again to Figure 14, to the left of the hole-and-flange-forming mechanism and mounted upon block 102 are a pair of material-centering pins 114 which, upon each downward movement of block 102, enter two of the previously formed flanged holes, pass through the holes, and enter openings 116 in anvil 103, with the result that strip 8 is definitely centered during each downward punching operation.

Referring to Figure 2, rigidly mounted to the left of anvil 103 upon shaft 118 is shown one of a pair of arms 119, upon the free end of each of which is pivotally mounted a feed finger 120. The right end of each of feed fingers 120 is urged downwardly by tension spring 122, the other end of the spring being attached to the frame of the press. The left ends of feed fingers 120 are adapted to enter holes in each row of holes in strip 8. The left end surface of each finger 120 is vertical, while the upper surface of the end of the finger is sloped to form a cam, so that when feed fingers 120 are moved toward the right they will be depressed and retreat from the holes; but when they move toward the left they will enter and remain in the holes and advance strip 8 toward the left. As best shown in dotted lines just below the center of Figures 1 and 3, shaft 118 is actuated by arms 121 mounted near the ends thereof which, in turn, are actuated by rods 123. The other ends of rods 123 are carried by arms 124 which are fixably mounted upon shaft 126. Referring to Figure 1, shaft 126 also has fixably mounted thereon arm 128, the free end of which carries one end of eccentric rod 130. The other end of rod 130 is carried by eccentric collar 132 mounted upon eccentric 133 which is fixed upon the end of power shaft 134.

Upon rotation of shaft 134, eccentric collar 132 and rod 130 cooperate so as to translate the rotation into an oscillating motion at the lower end of rod 130. This oscillating motion is transmitted through arm 128, shaft 126, arms 124, rods 123 and arms 121 to shaft 118; with the result that (see Figure 2) arms 119, and with them feed fingers 120, oscillate ratchet-wise through a definite path of definite length so as to feed strip 8 in measured steps.

Eccentric 133 is mounted upon power shaft 134 so that this path is such as to cause feed fingers 120 to advance strip 8 a distance equal to the width of one fin, and so as to move feed fingers 120 to the left and thus advance strip 8 while block 102 is raised and is thus free from strip 8. In this way, feed fingers 120 advance the fin material the width of one fin immediately after a row of flanged holes has been formed, and then are returning so as to enter holes in the next row during the time that block 102 is engaging strip 8 to form another row of flanged holes. Thus, the holes in strip 8 are spaced in a definite relationship with respect to the cutter and the hole-forming mechanism. The extreme position of fingers 120 to the left may be controlled and determines the exact position of strip 8 during the hole-forming and the cutting operations. This allows for ready adjustment of the width of the fins and, at the same time, avoids errors which might result from inaccurate movement.

As best shown in Figure 7, cutter 150 includes a fixed cutter element 152 and a movable cutter element 154 which cooperate with each other so as to cut fins from strip 8 and, at the same time, trim the corners of the fins. Fixed cutter 152 is mounted upon base block 153 which is carried by the frame of the press 100. Referring now to Figures 5 and 6, movable element 154 is adjustably carried by sliding block 156 which is mounted upon guide pins 158 so as to move vertically. Guide pins 158 are slidably mounted at the top and bottom in bearings, the lower bearings being carried by base block 153, and the upper bearings being carried by block 159 which is mounted at its ends upon base block 153.

Referring again to the central portion of Figure 2, extending from the left side of plunger head 101 is actuating arm 160, the end of which enters a recess in the right side of block 156. Due to this construction, as plunger head 101 moves carrying block 102 it also carries with it movable cutter 154; and when the movement is downwardly a fin is cut from the end of the strip. Simultaneously, a row of flanged holes is formed in the strip between block 102 and anvil 103. As pointed out above, the spacing between block 102 and cutter 154 is such that as strip 8 is moved the width of one fin in the interval between two downward movements of plunger head 101, strip 8 is left in a new position such that a portion of strip 8, equal to the width of one fin, extends beyond the cutting edge of cutter 150. A row of flanged holes which were formed during a previous downward movement of the block 102 is spaced along a line which is the center line of the extending portion.

Referring again to Figure 7, the cutting edge of the fixed cutting element 152 is formed of five distinct portions, each of which cooperates with a corresponding portion of the cutting edge of the movable element 154. The main portion of the cutting edge of the fixed element is straight and is designated by the numeral 162, and terminates at its ends in arcuate portions 163. Edges 162 and 163 are in the horizontal plane of surface 164 which is the plane of the path of strip 8 as it travels through press 100. Spaced slightly below surface 164 and in the horizontal plane of surfaces 167, are arcuate edges 166 which extend from points which are in vertical alignment with the points of juncture between edge 162 and edges 163.

Fixed cutter element 152 is cut out behind edges 166 and below edges 163 so as to form recesses, of which the bottom surfaces 165 slope downwardly and backwardly. As best shown in Figure 7a, these recesses open into passages 169 in base block 153, which (see Figure 2) communicate with chutes 170 leading into the bottom of the press. This facilitates disposal of waste pieces cut from strip 8.

Referring again to Figure 7, the upper cutting member is provided with a straight center edge 168 which terminates at its ends in arcuate extending edges 172. Edges 168 and 172 all form edges of horizontal surface 174. Spaced above surface 174 the same distance that surface 164 is above surfaces 167 are arcuate edges 175 which form edges of horizontal surfaces 176. Movable cutter element 154 is cut out upwardly from edges 175 and 168 so as to form a recess 178; and thus the upper cutting member fits over and registers with the lower cutting member.

Edges 168, 172 and 175 are in vertical alignment with and are of the same size and shape as edges 162, 166 and 163, respectively.

In explaining the operation of the cutter, consider that a strip of fin material 8 rests upon surface 164 and extends beyond edge 162 a distance equal to the width of one fin (as shown in Figure 8). Referring now to Figure 7, as movable cutter element 154 descends, surface 174 will engage the top of the fin material and thrust downwardly thereon. Upon further downward movement, cutting edge 168 will cooperate with cutting edge 162 so as to cut the fin free from strip 8 except at its extreme ends, that is, the sides of strip 8. During this first cutting operation and for a short time thereafter, surface 174 has not reached the plane of surface 167 and cutting edges 172 and 166 have not yet come into cutting cooperation. Similarly, surfaces 176 have not reached the plane of surface 164, and cutting edges 175 and 163 cannot yet cooperate. During this short period of time after the center portion of the fin has been cut free and before surfaces 174 and 176 reach surfaces 167 and 164, respectively, the fin is pushed downwardly by surface 174, but is held at its ends (Figure 8) by the narrow and still uncut portions 180.

As cutter element 154 moves further downwardly, cutting edges 166 and 163 meet cutting edges 172 and 175, respectively, so as to cut out a portion 180 at each side of strip 8 and thus cut fin 9 entirely free from strip 8 and, at the same time, round the adjacent corners of fin 9 and the end of strip 8. These portions 180 fall upon surfaces 165 and slide downwardly through passages 169 and (see Figure 2) through chutes 170 to container 117 in the bottom of the press.

*Fin-positioning mechanism*

The mechanism for spacing the fins upon a set of the U-tubes is entirely automatic after it is once started, and receives each fin individually as it is cut from strip 8 and places it in the proper position upon the U-tubes. This mechanism includes followers which are carried between two endless chains and which, during the operative portion of their movement, move continuously downwardly along one side of the U-tubes.

As best shown in Figure 2 followers 202 are mounted upon shafts 204 and are allowed to rock between the two positions shown, but are normally biased counter-clockwise to the position shown in the bottom half of the figure. There are a large number of identical followers and one will be described in detail, together with its mounting means.

The means for biasing follower 202 is shown best in Figure 8 and is a spring 206 mounted upon the center of and attached at one end to shaft 204. The other end of spring 206 is attached to follower 202. The upper portion of follower 202 (see also Figure 10) is provided with a paddle 246; and the lower portion (see Figure 8) has two sleeve journals 244 and 245 which are rotatably mounted upon shaft 204. Paddle 246 is substantially the length of fin 9 and is provided with fingers 248 which fit tightly about a portion of the periphery of the flanges 109 and extend between the U-tubes so as to exert force upon the fins in such a way as to avoid distortion of the fins.

Follower 202 also carries, along its center line, roller 250 which is rotatably mounted (see Figure 10) upon a shaft 251 above and to the left of shaft 204. Referring now to Figure 8, freely mounted upon shaft 204 adjacent the inner end of sleeve journal 244 is actuating roller 252. A web-supporting structure 247 connects sleeve journals 244 and 245 over the top of roller 250.

Shaft 204 is fixedly mounted at its two ends in link brackets 208 which are in pairs, each pair forming a link of one of the two endless chains 209. Upon the ends of shaft 204 are extensions upon which are mounted roller bearing elements 210 which are held by guide strips 211 so as to ride in vertical grooves 212 and 213. These grooves are in frame members 214 and 215, respectively, and guide the followers as they move downwardly along the side of the U-tubes.

Referring to Figures 2 and 12, frame members 214 and 215 also act as mounting means for the other parts of the follower control mechanism and for this purpose, mounted in bearings at the top and bottom of frame members 214 and 215, and shafts 216 and 220. Upon shafts 216 and 220 are fixedly mounted two pairs of sprocket wheels 218 and 222, respectively, which carry endless chains 209, referred to above.

Supported by suitable web structure upon frame members 214 and 215, and located vertically therebetween, is slide support channel 224. As best shown in Figure 8, slide support channel 224 is substantially U-shaped in horizontal cross-section and its interior channel 226 provides a guideway for the reciprocating slide 228.

Reciprocating slide 228 comprises two side members 229 and roller strip face 230 which are welded together and are reenforced (see Figure 9) at the top by cam member 231 and at the bottom by blocks 227 and 233.

Referring to Figure 12, mounted on the right-hand side and near the top of slide 228 upon suitable adjustable mounting means is release pin 293, the purpose of which will be explained later. The mounting means for release pin 293 is shown in Figure 13 and comprises a fixed block 291 riveted to side member 229 upon which is adjustably mounted an adjustable block 292. Upon the outer face of fixed block 291 are horizontal grooves 295 and upon the adjacent face of adjustable block 292 are cooperating teeth 296. Adjustable block 292 is provided with a vertical slot 297 which is adapted to receive set screw 299 which is screwed into fixed block 291. Adjustment of release pin 292 is obtained by releasing set screw 299, positioning teeth 296 in the proper grooves 295 and then tightening set screw 299. Release pin 293 is hood-shaped and is mounted upon a stud 294 which is screwed into block 292 and which is locked in place by tightening up release pin 293.

Reciprocating slide 228 acts as a control means to control the position of the followers as they move downwardly, rocking the followers in position to engage the fins and then allowing the followers to retract and release the fins at the proper points. Thus, slide 228 actually controls the positions in which the fins are placed on the U-members.

Slide 228 is adapted to move in channel 226 between the lower position, shown in Figure 11, and the upper position, shown in Figure 2; and is held in channel 226 by three pairs of guide rollers 232 which are carried near the top, center and bottom of slide 228. As best shown in Figure 8, guide rollers 232 are held in channel 226 by guide plates 236 and, as shown in dotted lines in Figure 12, are carried upon the ends of pins 234.

Referring also to Figure 2, mounted in the back and extending from the bottom to a point slightly above the middle of channel 226 is rack 238. As best shown in Figure 9, pivotally mounted near the bottom and on the left side of slide 228 are two dogs 240 and 242 which are biased by springs 241 and 243, respectively, in a clockwise direction so that they tend to engage the teeth in rack 238. These teeth are shaped so as to have upper faces which are in alignment with the ends of the dogs which cooperate therewith; and thus, slide 228 is held from downward movement except when dogs 240 and 242 are withdrawn from their normal position. The lower faces of these teeth are inclined to permit the dogs 240 and 242 to slide over them when slide 228 moves upwardly.

As pointed out above, the followers may rock between two positions, and when in the extended position shown at the top of Figures 9 and 10 and in Figure 8, the paddles 246 extend outwardly to engage the fins as the fins are cut off. In the retracted position shown at the bottom of Figures 9 and 10, the paddle is withdrawn and freed from the fins.

As best shown in Figure 2, as the followers are carried by chains 209 around sprocket wheels 218 they are in the retracted position and remain in that position until rollers 250 contact cam member 231 at the top of reciprocating slide 228. As each follower 202 reaches cam member 231, its roller 250, riding upon cam member 231, rocks follower 202 clockwise to its extended position. Upon further downward movement of follower 202, roller 250 will ride upon roller strip 230 and thus hold the follower 202 in its extended position.

Referring to Figures 9 and 12, pivotally mounted upon the bottom of slide 228 is pointed actuating arm 254, the pointed free end of which extends downwardly and to the right (Figure 9) into the path of rollers 252. Rotatably mounted between the two side walls 229 of reciprocating slide 228, upon a suitable bearing (see also Figure 8) carried by shaft 258, at a point below pivot 256 is bell crank 260 which has a vertical portion and a horizontal portion; the horizontal portion carrying at the end thereof pin 261 upon which is pivoted dog 240. Extending from the right side (Figure 12) of pointed arm 254 through a slot in the side wall 229 of slide 228 and into engagement with a groove in the top of the vertical portion of bell crank 260 is actuating pin 262.

Referring again to Figure 9, bell crank 260 and pointed arm 254 are normally biased, along with dog 240, by spring 241 to the position shown. As each actuating roller 252 is carried downwardly, it engages the free end of pointed arm 254 and rocks this arm clockwise. This movement of arm 254 is transmitted through pin 262 to bell crank 260 so as to cause bell crank 260 to rotate counter-clockwise. This movement of bell crank 260 causes the bell crank to pivot upon shaft 258 so as to thrust downwardly upon dog 240 and raise slide 228. As slide 228 rises, dog 242 slides over a suitable number of the notches in rack 238; and when actuating roller 252 passes the end of pointed arm 254, spring 241 returns dog 240, bell crank 260, and pointed arm 254 to normal position.

The movement of pointed arm 254 is such that dog 240 raises slide 228 a distance equal to the desired spacing of fins 9 upon U-tubes 141, and it is thus seen that as each follower carries its actuating roller 252 past arm 254 the slide 228 is raised the distance of one fin from the adjacent fin and is retained in the new position by dog 242.

Considering now that the elements are in the position shown in Figure 9, the followers are held in their extended position as they pass slide 228 and each is tilted back by its spring as its roller 250 clears the lower end of roller strip 230. Follower 202a is shown moving downwardly and is about to engage fin 9a which is about to be cut from strip 8. As surface 174 (see also Figure 7) moves downwardly so as to engage the upper surface of fin 9a, and cutting edges 168 and 162 start cutting the middle portion of fin 9a free, the paddle of follower 202a engages the top of fin 9a and pushes downwardly thereon. As explained above, (referring to Figures 7 and 8) as the upper cutting member and follower 202a carry the fin downwardly, the fin is held at its ends by means of portions 180 and flanged holes in the fin are guided over the ends of U-tubes 141 (Figure 9) by round-nosed plugs 144. Upon further movement downwardly, cutting edges 172 and 175 cooperate with cutting edges 166 and 163, respectively, so as to cut the fin entirely free from strip 8; and the upper cutting member moves upwardly again, while the follower carries the fin downwardly along the tubes. In Figure 9, fin 9b has reached the desired position upon U-tubes 141 and roller 250 upon follower 202b has cleared the lower end of roller strip 230 so as to allow follower 202b to be tilted backwards and web 247 has momentarily come in contact with block 233. When web 247 moves free of block 233, follower 202b will move to its retracted position. In Figure 9, follower 202c has carried fin 9c to its proper position and is moving on downwardly. Above follower 202a, follower 202d is moving downwardly so as to receive the next fin which is to be cut from strip 8. Actuating roller 252d upon follower 202d is about to engage pointed arm 254 and thereby elevate slide 228 a distance equal to the spacing between one fin and the adjacent fin. Follower 202a will, therefore, place fin 9a upon U-tubes 141 at a point properly spaced above fin 9b.

In the normal operation of the machine, at the time fins have been placed throughout the length of a set of U-tubes 141, slide 228 has been moved upwardly to the position shown in Figure 2 and the top of the slide engages set screw 264 which is adjustably carried in a vertically slidable bracket 266; and bracket 266 is moved upwardly. Movement of bracket 266 draws link 268 upwardly which rotates lever 272 and shaft 270 to which lever 272 is keyed. As will be explained later, this rotation of shaft 270 stops the entire machine.

With the machine stopped in the position shown in Figure 2, the finished unit, comprising a set of U-tubes with the desired number of fins thereon, may be removed from the machine and a new set of U-tubes may be properly positioned to receive fins. As best shown in the left-hand portion of Figure 9, horizontal shaft 278 is rotatably mounted and has rigidly mounted thereon arm 280, in the free end of which is fixed horizontal pin 282. Pin 282 engages a horizontal slot in the upper end of dog-disengaging bar 284 which is mounted in channel 226 (see also Figure 8) and which (see Figure 9) has two diagonal slots 286 therein through which fixed pins 288 extend, fixed pins 288 being mounted in slide support channel 224. When a new set of tubes is in position, handle 274 is pulled downwardly against the tension of spring 276 (see also Figure 3) so as to rotate shaft 278 and arm 280 counter-clockwise (Figure 9). This movement raises dog-disengaging bar 284 which, due to slots 286 riding upon fixed pins 288, when raised, moves to the right from the position shown in Figure 9 to the position shown in Figure 10. When moving to the right, the right edge of dog-disengaging bar 284 contacts the left side of the movable ends of dogs 240 and 242 and moves the dogs out of engagement with rack 238. Dogs 240 and 242 are, therefore, rendered ineffective, and slide 228 moves freely downwardly until block 233 engages the next follower below which is in its retracted position.

This movement of slide 228 is very slight but it is sufficient to move the top thereof (Figure 2) free from set screw 264 and the machine may now be started again. Referring to Figure 9, rockably mounted to the right of lever 280 upon slide support channel 224 is bell crank 289 which has a horizontal portion extending to the right (Figure 9) along the side of slide 228 into the path of release pin 293 (see Figure 12) which is fixed to slide 228. Bell crank 289 also has a latch portion extending upwardly and to the left (Figure 9). Fixedly mounted upon shaft 278 and extending into engagement with the end of the latch portion of bell crank 289 is latch dog 290. Bell crank 289 is biased by spring 298 so that its left end normally tends to move downwardly and so that when shaft 278 is rotated to release dogs 240 and 242 this latch portion falls behind latch dog 290, as shown in Figure 10. This engagement of the latch portion of bell crank 289 with latch dog 290 latches shaft 278, and with it dog-disengaging bar 284 and dogs 240 and 242, in the position shown in Figure 10 so that, even though the operator removes his hand from handle 274, dogs 240 and 242 are still held out of engagement with rack 238.

With the new set of tubes in position, and slide 228 resting upon follower 202', as shown in Figure 10, the machine may be set in operation and the chains will start lowering follower 202' and with it slide 228. During this movement downwardly, slide 228 holds a given number of the followers in the extended position, and as each follower passes the cutter it picks up a fin in the usual manner and carries it downwardly along the tubes, all as previously described. Referring to Figures 11 and 12, shortly before the leading fin reaches its proper position upon the U-tubes, release pin 293 engages bell crank 289, releasing latch dog 290 and allowing dog-disengaging bar 284 to drop so that dogs 240 and 242 re-engage rack 238, arresting downward movement of slide 228. The follower carrying the leading fin will, therefore, continue downwardly until its roller 250 moves free of slide 228 and the follower is rocked to its retracted position. As movement of the followers continues, a follower-actuating roller 252 engages pointed arm 254 so as to step slide 228 up a distance equal to the desired spacing between one fin and the adjacent fin, and the next fin is then placed in position. This operation is repeated until the desired number of fins have been placed upon the U-tubes and slide 228 has reached its extreme upward position, as explained in detail above.

U-tube holding mechanism

The means for holding the U-tubes is best shown in Figures 5 and 6 and comprises a fixed frame 181 which is built as part of the base of the machine and a sliding rack 142 which is adapted to receive a set of three U-tubes in each of its two sections. Sliding rack 142 is carried by frame 181, the bottom of sliding rack 142 being held by retaining strip 184 so as to slide in track 183. Extending along the back (to the right in Figure 6) of sliding rack 142 is rigidly mounted a guide strip 185 which is T-shaped in cross-section and which slides in a corresponding groove in frame 181. Rack 142 is thus rigidly held and adapted to be slid horizontally along the length of track 183 by either of handles 198, and is limited in the two extremes of its movement by stop plates 197.

When rack 142 is in the position shown in Figure 5, the left-hand section thereof is positioned so that the set of U-tubes therein may receive fins; and the right-hand section is positioned so that the U-tubes, with fins placed thereon, may be removed and a new set of U-tubes placed therein. When placing the U-tubes in position, the bottom of the U-tubes is received in a suitably shaped recess 186 and the top is received by holding strip 187. Holding strip 187 is best shown in Figure 4, and is provided with three cut-out portions 187a, 187b, and 187c, each of which receives a U-tube under slight tension.

A holding strip 187 is resiliently held in a horizontal position near the top of one side of rack 142 by means of a spring-pressed side bar 188. Each section of rack 142 is provided with a side bar 188, it being located in each case on the inside of the vertical wall of the rack (along the left wall of the left section and along the right wall of the right section) and supported by means of springs 189. Side bar 188 is adapted to push resiliently against one end of holding strip 187 so as to hold the other end thereof against the opposite side of the section. As the first fin moves downwardly upon a set of U-tubes, it will engage the top of holding strip 187, moving it downwardly. After the first fin starts moving downwardly upon the U-tubes, the tops of the U-tubes will be held in position by the fin and it will be no longer necessary to hold the tops of the U-tubes by other means. Holding strip 187 is moved downwardly to the position shown in the right-hand section of Figure 5, and may then be removed with the completed unit and may be replaced to its proper position so as to hold a new set of U-tubes.

Mounted in holes in guide strip 185 and on the center line of the left and right sections are sleeves 190 and 190', respectively, which are adapted to receive in their center holes locking pin 191, which is slidably carried in sleeve 192 in fixed frame 181. In Figure 5, pin 191 is inserted in sleeve 190, thereby locking rack 142 in position. When desirable, pin 191 is withdrawn from sleeve 190, rack 142 is moved to the left, and pin 191 is inserted in sleeve 190'. Rack 142 is thereby locked in the proper position for fins to be placed upon U-tubes in the right-hand section of the rack.

Locking pin 191 is moved to and from its locking position through a pin and slot connection by arm 193 which is rigidly mounted upon shaft 194. Shaft 194 is mounted in the base of the press and extends out at both sides so that it may be operated from one side (Figure 1) by a suitable handle 196, and from the other side (Figure 3) by handle 195.

Safety stop mechanism

During the operation of this machine, it is desirable that the machine automatically stop in case of obstruction. A means for accomplishing this is shown in Figures 15, 16 and 17 and is means (shown also in Figure 1) for receiving power from the main drive shaft of the press through chain 311 and transmitting the power through another chain 309 to the upper shaft 216 of the fin-positioning means. Supported upon side frame member 214 by suitable spider structure is sleeve bearing 300. Suitably supported in a like manner, concentric with sleeve bearing 300, and extending through a hole 301 in side frame member 214, is sleeve bearing 302. Extending through bearings 300 and 302 is main drive sleeve 304. Sleeve 304 is held from endwise movement with respect to bearing 302 by thrust bearings 306 and 308. Keyed to the left end of sleeve 304 is main drive sprocket 310 which is driven by a chain 311 from the main drive shaft of the press (see Figure 1).

Rotatably mounted on sleeve 304 adjacent thrust bearing 308 is driven sprocket 312 which, as best shown in Figure 16, has a hub portion 313 into the left end of which are cut a plurality of notches. These notches are each provided with one face 314, which is in a plane parallel to and extending through the axis of rotation, and one end sloping face 316. Slidably mounted upon sleeve 304 and having one face adjacent the notched end of hub 313 is collar 318. Collar 318 is provided with projections 319 which are of the same size and configuration as the notches in hub 313 so that the adjacent end faces of the hub 313 and collar 318 normally register with each other, there being faces 317 upon collar 318 to correspond to faces 316 on hub 313. Referring to Figure 15, collar 318 is slidably keyed to sleeve 304 by means of key 320, so that collar 318 must rotate with sleeve 304 but may slide axially thereon. The center portion of collar 318 has an enlarged flange thereon which is provided with suitable recesses to receive one end of each of a set of four springs 322. Adjustably mounted upon sleeve 304 and adapted to receive the other ends of springs 322 is spring-retaining collar 324. Extending radially through slots 326 in sleeve 304 and rigidly mounted at its ends in collar 324 and at its center in adjusting bar 328 is pin 330. The left end of the hole in sleeve 304 is threaded and is provided with adjusting screw plug 332 and lock screw plug 334. In assembling the parts, adjusting screw plug 332 is turned into the threaded end of sleeve 304 until adjusting bar 328 is engaged and pushed to the right so as to move pin 330 along slots 326, carrying collar 324 a distance sufficient to provide the desired tension upon springs 322. Lock screw plug 334 is then turned tightly against screw plug 332.

Extending radially through slots 336 in sleeve 304 and rigidly mounted at its ends in collar 318 and at its center in operating shaft 338 is pin 340.

rately squares the ends. Handle 388 is then swung to the vertical position while the cut-off ends of the two strips are removed, and the advance end of the new strip is pushed in so as to overlap the end of the old strip, as shown in Figure 22. As will be explained later, this overlapping is only enough to make the stitch and is not enough to interfere with making the flanged holes in the strip. Handle 388 is now swung to the right, and movable stitcher element 356 is thereby moved downwardly to the position shown in Figure 23. This movement pushes the two strips downwardly, puncturing the two strips and displacing portions thereof, thereby making a stitch wherever there is a needle 360, as shown in Figure 23.

Mounted to the right (Figures 21, 22, and 23) of stitching needles 360 are releasing pins 408 which are similar in structure to cooperating pins 398 and are normally held in the position shown in Figures 20, 21 and 22 by springs 410. When movable stitcher element 356 moves downwardly to the position shown in Figure 23, the material is pressed against pins 408 so as to depress them to the position shown.

As handle 388 is again moved to the vertical position, pins 408 push upwardly upon the material and release it from stitching needles 360; and pins 398 push downwardly within cutting sleeve 400 so as to push the material therefrom.

The material is now free to be moved to the right by the normal operation of the machine, and as it does so there is some possibility that the stitches formed will be abnormally thick and will interfere with the movement of strip 8. To avoid this possibility and, at the same time, improve the stitches, mounted in line with stitching needles 360 are rollers 412. Rollers 412 are rotatably mounted upon shaft 414 which is held at its ends by brackets 416 which are rigidly mounted upon base frame 364.

As suggested above, the spacing of stitching needles 360 and fin cutter 150 (Figure 2) is such that the line formed by the right-hand side of the stitcher heads 394 is later the dividing line between two fins. Thus, the cutter 150 will cut the material along the right-hand edge of the line of the stitches so as to free the two portions of the stitch which would otherwise cause a double thickness of metal in the fins. These portions which, in Figure 23, are the portion of the upper strip to the right of the right-hand edge of the line of stitches and the portion of the lower strip to the left of the right-hand edge of the line of stitches may then be removed and the edges of the fins may be smoothed out to the original position so as to eliminate practically all evidence of the stitches. The stitches formed thus perform the function of holding the two strips of material together during the time that the new strip is being threaded into the machine, but the stitches are not present in the final product.

*Oiler*

As best shown in Figures 1 and 2, mounted to the right side of stitcher 352 is oiler 417, the details of which are shown best in Figures 18 and 19. Rigidly mounted upon a roller 422 in pan 418 are annular felt strips 420 and brake disc 424. Extending around brake disc 424 and tensioned by means of an adjustable spring 425 (see also Figure 1) to produce friction with brake disc 424 is band 426. Band 426 is attached to the side of pan 418 and is thus retained in fixed position. Pan 418 contains suitable oil, and as the strip of fin material rides upon felt strips 420 roller 422 revolves so as to carry the oil upwardly and apply it to the under-side of the strip. The tension upon band 426 may be adjusted so as to regulate the speed of rotation of roller 422 and thus control the amount of oil which is placed upon the strip.

*Material holder*

The mechanism for holding the strip of fin material 8 in coiled form is holder 10, and is best shown at the right of Figure 1. In actual operation, holder 10 is located further to the right of press 100 than shown, the showing of Figure 1 being for convenience only.

Holder 10 comprises cylinder 12 which is adapted to receive, and have latched thereon by means of latches 14, coiled strip 8. Cylinder 12 is provided with suitable mechanism to control the unwinding of coiled strip 8 and is mounted upon post 16. Mounted on post 16 below cylinder 12 by means of bar 18 is a bracket structure which includes three horizontal rods 20, 22 and 24, two fixed angular rods 26 and 28 and a swinging U-shaped brake of tension member 30. Swinging U-shaped tension member 30 comprises two side bars which fit along the side of strip 8 and a top horizontal portion which normally lies against coiled strip 8, as shown. Strip 8 thus unwinds as it is used and is kept under constant tension.

*Control mechanism*

The control mechanism comprises clutch means to connect the driving motor to the main power shaft and brake means which, in the present embodiment, is applied to the main power shaft whenever the motor is disconnected. All this is associated with various safety means which prevent the operator from starting the machine except when the machine is in proper condition and which stop the machine in case of trouble.

Referring to Figure 3, the fly-wheel clutch (not shown), which, when in engaging position connects motor 140 to main power shaft 134, is moved to engaging position by a movement of rod 40 upwardly and is moved to disengaging position by movement of rod 40 downwardly. Rod 40 is carried at its lower end upon the end of pivoted arm 42 and at its upper end in control box 41. Coiled about rod 40 near its lower end is spring 44 which is compressed between fixed U-member 46 at its bottom and collar 48 at its top. U-member 46 is mounted upon the base of press 100 and collar 48 is adjustably mounted upon rod 40. Spring 44 thus normally biases rod 40 in its upper position so as to tend to hold the control for fly-wheel clutch in the disengaging position. Arm 42 is pivoted upon stud shaft 50 and carries one end of bar 52. The other end of bar 52 is carried by the free end of arm 54 which is rigidly mounted upon control shaft 56.

Control shaft 56 extends the width of the base of the press and has rigidly mounted thereon, in addition to arm 54, operating pedal 58, arm 60 and (Figure 1) arm 62.

Rigidly mounted upon main power shaft 134 is brake drum 91, around which is mounted brake 92. Brake 92 is mounted on the frame of press 100 and is normally retained in braking position by means of spring 93 and is moved from braking position by the movement of cam arm 94 downwardly. Cam arm 94 carries at its outer end the upper end of brake control rod 95, the lower Shaft 338 is slidably mounted in sleeve 304 and has mounted upon the right end thereof bevel disc 342. Pin 340 thus limits the movement of operating shaft 338 and bevel wheel 342 to an axial movement a distance equal to the length of slots 336 and makes the position of bevel wheel 342 dependent upon the position of collar 318. Bevel wheel 342 may be moved by collar 318 from the position shown in Figure 15 to the position shown in Figure 16, but these elements are normally retained in the position shown in Figure 15 by springs 322.

Rotatably mounted in side frame members 214 and 215 adjacent bevel disc 342 is shaft 270, referred to above, upon which is rigidly mounted arm 346 which carries upon its free end, in the path of movement of the beveled edge of disc 342, a roller 348. When bevel disc 342 is moved from the position shown in Figure 15 to the position shown in Figure 16, roller 348 is engaged and shaft 270 is rotated, moving handle 350 downwardly which, as will be explained later, stops the operation of the entire machine.

In the normal operation of the machine, sprocket 310 moves clockwise (Figure 1), driving sleeve 304 which rotates collar 318 and through it hub 313 of sprocket 312, collar 318 being normally held in engaging relationship with hub 313 by means of springs 322. Thus, it will be seen that sprocket 312 is normally driven through engaging faces 316 and 317, previously described, the pressure upon springs 322 being adjusted by means of adjusting screw plug 332 so as normally to overcome the force tending to cause faces 317 to slide on faces 316. If, however, the operation of the machine is obstructed by abnormal load or otherwise, the force tending to cause faces 317 to slide on faces 316 will overcome the force of springs 322 and collar 318 will slide to the left against the pressure of springs 322 to the position shown in Figure 16. Sprocket 312 will, therefore, cease rotating and the fin-positioning means will stop. At the same time, this movement of collar 318 is transmitted through pin 340 to operating shaft 338 with the result that bevel disc 342 is moved to the left. As bevel disc 342 moves to the left, it engages roller 348 and pushes upwardly thereon so as to rotate shaft 270 and move handle 350 downwardly so as to stop the machine.

It is thus seen that this drive means will carry a normal load, but if an abnormal load is encountered the entire machine will be stopped. An example of such an abnormal load would be the machine jamming, due to the fins not moving properly downwardly upon the U-tubes.

*Stitching mechanism*

Referring to Figure 2, mounted upon the right side of the base of the press, and in the path of the strip of fin material 8 is stitcher 352 which is used, when one strip of material is exhausted, to fasten the end of the exhausted strip to a new strip. As best shown in Figures 21 and 22, the stitcher includes a movable cutter element 354, a movable stitcher element 356, and a fixed cutter element 358, in which are mounted a plurality of stitching needles 360. The fixed cutter element 358 is rigidly mounted upon base 362, and the movable elements 354 and 356 are mounted for limited vertical movement upon base frame 364. The movable elements 354 and 356 are each mounted by means of a plurality of screws which extend downwardly through base frame 364.

The left-hand side of Figure 20 is cut away so as to show one of screws 366, the lower end of which is securely threaded in movable stitcher element 356 and the head of which snugly fits the enlarged upper portion of hole 368. Coil spring 370, within hole 368, exerts pressure upwardly on the head of screw 366 so as to tend to retain screw 366, and thus movable stitcher element 356, in the upper position shown in Figures 20, 21 and 22.

The upper right-hand side of Figure 20 is cut away to show one of screws 372, which are identical with screws 366 and are mounted in holes 374 with springs 376 so as normally to retain movable cutter element 354 in the upper position shown in Figure 22.

Referring to the upper portion of Figure 20 and to Figure 18, rockably mounted in recesses 378 upon pivots 380 and normally positioned as shown in Figure 18 are two cam arms 382 and 384. These cam arms are connected to each other by means of bar 386; and cam arm 384 has handle extension 388 thereon which is used to operate both of the cam arms. On the lower end of each of these cam arms 382 and 384 are two cam portions which are selectively used to operate either movable cutter element 354 or movable stitcher element 356. As shown in both Figures 20 and 21, the left-hand cams 390 are positioned so that when handle 388 is swung to the left (Figure 20) cams 390 move cutter element 354 downwardly, from the position shown in Figure 22 to the position shown in Figure 21. Right-hand cams 392 are so positioned that when handle 388 is swung to the right cams 392 move stitcher element 356 downwardly, from the position shown in Figure 22 to the position shown in Figure 23. Thus, when handle 388 is moved to the left the cutter mechanism is operated, and when handle 388 is moved to the right the stitcher mechanism is operated.

As best shown in Figure 23, each of stitching needles 360 is provided with a head portion 394 which has an inclined upper face 396, the edge of which is a cutting edge. Mounted in movable stitcher element 356 directly above each stitching needle 360 is cooperating pin 398 which is surrounded by cutting sleeve 400. Cooperating pin 398 terminates at its upper end in a head which is slidably positioned in the enlarged upper portion of hole 402. Retained above pin 398 in hole 402 by means of screw plug 404 so as to bias pin 398 in its downward position is coil spring 406. As movable stitcher element 356 moves downwardly, the inner edge of cutting sleeve 400 cooperates with the top portion of the cutting edge of head 394 and the material therebetween is pierced. Upon further movement downwardly, movable stitcher element 356 comes to the position shown in Figure 23 wherein a portion of the material is projected upwardly in the hole in cutting sleeve 400 by head 394 so as to displace cooperating pin 398 upwardly. The lower face of movable stitcher element 356 is pressed tightly toward the upper face of fixed element 358 so as to compress the material therebetween.

In operation, shortly before the end of an exhausted strip of material reaches stitcher 352, the forward end of a new strip is placed on top of the rear edge of the exhausted strip to the extent shown in Figure 21, and handle 388 is swung to the left. This movement of handle 388 to the left cuts off the ends of the two strips of material, as shown in Figure 21, and accuend of which is carried by arm 62. When operating pedal 58 is pushed downwardly so as to rotate control shaft 56 to the running position, brake control rod 95 is pulled downwardly so as to operate cam arm 94 and thus release brake 92 from brake drum 91. When control shaft 56 then rotates to the stopped position, cam arm 94 will be moved upwardly and spring 93 will again be allowed to apply brake 92 to brake drum 91.

Brake 92 is, therefore, released and motor 140 is connected to main power shaft 134 whenever operating pedal 58 is pushed to its down position; and brake 92 is immediately applied and motor 140 is disconnected whenever operating pedal 58 is moved to its up position. Due to the biasing of rod 40 by spring 44 and the biasing of brake 92 by spring 93, the flywheel clutch and brake 92, and with them control shaft 56, are normally retained in the stopped position of the press.

Referring again to Figure 3, arm 60 carries at its free end one end of latch-operating rod 64, the other end of which is carried by latch 66 which acts as latching means to latch the press in either the stopped or running condition. Latch 66 is pivotally mounted upon stud bolt 68 so as to be in the position shown in Figure 3 when the press is stopped, and so as to be moved to the position shown in Figures 3b and 3c when the control of the press is moved to the running position.

As pointed out above in connection with the description of the movement of sliding rack 142 (Figures 5 and 6), when handle 195 is in the down position, shown in Figure 3, pin 191 is properly positioned in one of the two sleeves 190 or 190', showing that sliding rack 142 and thus a set of U-tubes are properly positioned. If handle 195 is moved to its upper position, shown in dotted lines in Figure 3, pin 191 will be withdrawn and sliding rack 142 will be free to move. It is desirable that the machine not be started except when sliding rack 142 is locked in a proper position by pin 191.

To perform this function, extending downwardly from handle 195 is operating rod 78 which is connected at its lower end through pivot pin 76 to the left end of latch bar 70 which is pivoted on stud 72 and in the right end of which is formed a notch 74. With latch 66 in the stopped position, shown in Figure 3, when handle 195 is raised so as to withdraw pin 191 notch 74 falls over the end of latch 66 so as to prevent clockwise rotation of latch 66. It will thus be seen that when pin 191 is withdrawn, latch 66, latch operating rod 64 and arm 60 will be held fixed, thereby preventing movement of control shaft 56 and the machine cannot be started.

During the time that the machine is running, it would be undesirable to withdraw pin 191 because of the possibility of accidental movement of sliding rack 142. With the machine in the running position, latch 66 will be in the position shown in Figure 3c; and any attempt to pull up on handle 195 will cause the right end of latch bar 70 to engage the top of latch 66, as shown in Figure 3c, and so prevent handle 195 from being moved enough to withdraw pin 191. Operating rod 78, latch bar 70, latch 66 and latch operating rod 64, therefore, cooperate so as to prevent the starting of the machine after pin 191 is withdrawn and so as to prevent the withdrawal of pin 191 while the machine is running.

Freely mounted upon stud bolt 72, between latch bar 70 and the side wall, is latch arm 80 which, as best shown in Figures 3a and 3b, is connected through a pin and slot connection at its free end with operating arm 82. Operating arm 82 is rigidly mounted upon shaft 84 which has rigidly mounted thereon arm 86. Arm 86 is connected through rod 88 to operating handle 350 which, as pointed out above, is rigidly mounted upon shaft 270. Attached at one end to handle 350, and at the other end to side frame member 215, is spring 90 which normally biases handle 350 upwardly. It will be seen that when latch 66 is moved clockwise from the position shown in Figures 3 and 3a to the running position, shown in Figure 3b, spring 90 will pull upwardly upon handle 350, thereby carrying rod 88 and arm 86 upwardly and rotating shaft 84 and arm 82 counter-clockwise so that latch arm 80 will fall and notch 81 will catch on the left side of latch 66, as shown in Figure 3b. Latch 66, and with it latch operating rod 64, arm 60 and operating shaft 56, will thus be retained in the running position by latch arm 80.

As pointed out above in connection with the description of the normal stopping of the machine when a unit is completed and the stopping of the machine by the safety stop mechanism, if shaft 270 is rotated so as to push downwardly on handle 350 latch arm 80 will be raised and, due to the action of springs 44 and 93, control shaft 56 will be moved to the stopped position.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

I claim:

1. In a device for assembling fins upon tubes to form a heat exchange apparatus, the combination of, means to hold the tubes in proper position, an endless chain, means to carry said endless chain including a plurality of wheels, follower members rockably mounted upon said chain, the chain being movable about the wheels and one run of the chain being so located as to carry the follower members parallel to and along the length of the tubes, means to normally bias the follower members into a retracted position away from the tubes, runner means movably mounted adjacent the tubes along which the follower members run and are thereby held in an extended fin engaging position as they move along the tubes, means to place fins adjacent the ends of the tubes in the path of the follower members when they are in the extended position so that the follower members move the fins onto the tubes, means for actuating the chain in one direction for so moving the follower members, and means for moving the runner means in the opposite direction, said movement being so coordinated that the runner means moves out of the way of one follower means after another to release the same and deposit fins at spaced intervals along the tube.

2. Apparatus as recited in claim 1 in which there is constant relative movement between the individual fins and the tubes and in which the means for moving the runner means includes means adapted to be engaged and operated by each of the follower members as the follower members move along their path to deposit the fins so that the runner member is moved in step-by-step fashion.

3. In a device for assembling fins upon tubes to form a heat exchange apparatus, the combination of, means to hold the tubes in proper position, an endless chain, means to carry said endless chain including a plurality of wheels, follower members rockably mounted upon said chain, the chain being movable about the wheels and one run of the chain being so located as to carry the follower members parallel to and along the length of the tubes, means to normally bias the follower members into a retracted position away from the tubes, runner means including a trip portion and movably mounted adjacent the tubes along which the follower members run and are thereby held in an extended fin engaging position as they move along the tubes with each follower member releasing its fin when it moves past said trip portion, means to place fins adjacent the ends of the tubes in the path of the follower members when they are in the extended position so that the follower members move the fins onto the tubes, means for actuating the chain in one direction for so moving the follower members, and means for moving the runner means with the effect that the trip portion moves in the opposite direction, said movement being so coordinated that the runner means moves out of the way of one follower means after another to release the same and deposit fins at spaced intervals along the tube.

4. In a device for assembling fins upon tubes, the combination of: an endless chain mounted to be moved with one run of the chain moving along the tubes; a plurality of follower members rockably mounted upon said endless chain to receive fins and move them individually to their proper positions upon the tubes; said follower members being mounted so that they may be moved from a normally retracted position to an extended position where they engage the fins; and means to control the distance that each follower member moves its fin including, a runner member to hold the follower members in an extended position so that they are adjacent to the tubes, said runner member having a track against which the follower members ride with the follower members being thereby held in their extended position; and means to impart step-by-step movement to said runner member comprising, a stationary vertically extending rack, a dog assembly carried by said runner member and including a first dog and a second dog both of which are resiliently held engaged with said rack to thereby prevent the downward movement of said runner member, said dog assembly including a mounting means for said second dog formed by a swinging pivot carried by a bell crank pivotally mounted on said runner member, and an actuating arm rockably mounted on said runner member and having a mechanical connection with said bell crank so that when said actuating arm is rocked said bell crank is also swung to thereby move said swinging pivot for said second dog with the result that when said actuating arm is oscillated said second dog engages said rack and moves said runner member upwardly in predetermined steps and so that in between these steps said first dog prevents the downward movement of said runner member, said actuating arm having its end positioned in the path of movement of said follower members so that said actuating arm is oscillated as each follower member passes whereby the movement of a follower member along said runner member results in the lifting of said runner member one step.

5. Apparatus as recited in claim 4 which includes, a dog disengaging bar adjacent to said rack and adapted to move to an operative position wherein it disengages said dogs from said rack, a lever to move said bar into operative position, a latch means to hold said bar in said operative position, and a pin mounted upon said runner member to disengage said latch means when said runner member has reached the bottom of said rack, whereby said bar may be rendered operative to disengage said dogs and as a result said runner member may be moved downwardly whereupon the dogs are automatically reengaged.

6. Apparatus as recited in claim 4 which includes control means which automatically stops the operation of the machine when said runner member has moved a predetermined distance upwardly thereby indicating that a predetermined number of fins have been positioned in their proper positions.

7. In apparatus for placing fins in spaced location upon tubes, the combination of: means to hold a pipe in upright position with an end adapted to enter a hole in a fin; fin-moving means comprising a plurality of follower members, means to move said follower members along a path parallel to the tube from one end of the tube toward the other end thereof, and means for rockably mounting each individual follower member with respect to said moving means so that it may move between an extended position in which the follower member engages a fin and a retracted position in which the follower member is free of the fins; and means to control the rocking of each of said follower members from its extended position to its retracted position to disengage its fin when it has reached its proper spaced location including, an element having a trip portion and means for moving said element upwardly along the tube as fins are successively deposited upon the tube, said element holding the advancing follower members extended and said trip portion riding off of said follower members during its upward advancement to successively effect the retraction of said follower members at spaced points.

8. Apparatus as described in claim 7 in which the means for moving the element having the trip portion is operated by the movement of the follower members.

9. Apparatus as described in claim 7 in which control means is provided including, means to prevent the starting of the means to move the follower members except when the tube-holding means is properly positioned, means to stop the operation of the apparatus when a predetermined number of fins have been positioned by the follower members, and means to stop the operation of the apparatus when the means to move the follower members requires a predetermined abnormal amount of power.

10. An apparatus in which tubes are held stationary in substantially vertical position and fins are moved downwardly along the tubes for successively shorter distances and then released to thereby deposit fins in vertically spaced relationship substantially throughout the tube length, the combination of, means for holding the tubes in vertical stationary position, a follower member for each individual fin, means for moving the follower members along the length of tubes held by said holding means, means connecting each follower member to said moving means and so constructed that each follower member may be held in extended position from the point in its path of movement where it receives the fin to the point in its path of movement where it releases the fins whereupon the follower member may move to its retracted position, means to maintain the follower members in their extended positions and to release the follower members to their retracted positions when their respective release points have been reached comprising, control means movably mounted to be moved along the tubes substantially throughout the zone where fins are to be deposited, and means to move said control means in opposite direction to the movement of said follower members, said movement being in steps with each step equal to the spacing between the fins on the tubes, and said control means being so constructed as to effect a retraction of an advancing follower member at each step and maintain the follower members moving behind the same in extended position.

WILLIAM L. O'BRIEN.